US006785076B1

(12) United States Patent
Alva

(10) Patent No.: US 6,785,076 B1
(45) Date of Patent: Aug. 31, 2004

(54) ALTERNATE TAPE REPOSITIONING METHOD DURING DATA RECOVERY

(75) Inventor: Mauricio Huerta Alva, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 504 days.

(21) Appl. No.: 09/620,281

(22) Filed: Jul. 17, 2000

(51) Int. Cl.[7] .................................................. G11B 5/09
(52) U.S. Cl. ......................................... 360/53; 360/74.1
(58) Field of Search ............................ 360/53, 46, 74.1

(56) References Cited

U.S. PATENT DOCUMENTS

| | | | | |
|---|---|---|---|---|
| 4,958,244 A | * | 9/1990 | Inazawa et al. | 360/72.1 |
| 5,323,276 A | * | 6/1994 | Ono | 360/53 |
| 5,490,149 A | * | 2/1996 | Nylander-Hill | 360/53 |
| 5,953,177 A | * | 9/1999 | Hughes | 360/74.1 |
| 6,084,733 A | * | 7/2000 | Ohzeki et al. | 360/53 |
| 6,147,943 A | * | 11/2000 | Ogasawara et al. | 369/44.32 |
| 6,469,854 B1 | * | 10/2002 | Gill et al. | 360/53 |

FOREIGN PATENT DOCUMENTS

| | | | | |
|---|---|---|---|---|
| EP | 0661702 A2 | 7/1995 | | G11B/15/18 |
| JP | 580006515 A | 6/1981 | | |
| JP | 02278575 | 11/1990 | | B11B/20/18 |
| JP | 2000010808 | 1/2000 | | G06F/11/10 |
| WO | WO86/06199 A | 10/1986 | | |

OTHER PUBLICATIONS

Search Report.
JP Abstract for doc. No. 02278575 (see above).
JP Abstract for doc. No. 2000010808 (see above).

* cited by examiner

Primary Examiner—David Hudspeth
Assistant Examiner—Glenda P Rodriguez

(57) ABSTRACT

A method of alternate tape repositioning during data recovery which takes advantage of the reverse half of the tape forward/reverse cycle to perform an error recovery procedure invoking, thereby reducing total data recovery time. In the event that a tape drive fails to read a target data block, the tape continues its linear travel until a forward ramp-up point beyond the target data block is reached. The tape drive changes tape travel direction to a reverse linear travel direction. When the tape heads are on top of the target data block, a first error recovery procedure invoking is performed in the reverse linear travel direction. If the first error recovery procedure invoking fails to recover data, tape continues its reverse linear travel until a reverse ramp-up point past the target data block is reached. Once again, the tape drive changes tape linear travel direction and a second error recovery procedure invoking is executed in the forward linear travel direction. The procedure of advancing tape, changing tape travel direction and invoking an error recovery procedure invoking continues until the data at the target data block is recovered, or until a pre-selected number of error recovery procedures invoking have been executed.

23 Claims, 4 Drawing Sheets

ALTERNATE TAPE REPOSITIONING METHOD DURING DATA RECOVERY

FIELD OF THE INVENTION

The present invention relates generally to storage and retrieval of data on magnetic tape and more particularly to a method of alternate tape repositioning during data recovery.

BACKGROUND

Controller electronics for a tape drive may include error correction and detection circuitry (ECC) to detect and correct data transfer errors in data retrieved from and written to a tape on a tape drive. ECC is applied to data "on-the-fly" as data is transferred to or from the media. Severe faults may render some errors unrecoverable by the ECC engine compromising integrity of the data. Tape drive firmware may include a module that may be activated to recover data which has been shown to be non-recoverable employing the ECC.

A fault causing a data transfer error may originate in the media, the read/write transducers, or drive electronics. However, it may be difficult for the controller to determine where the fault resides and consequently apply an effective recovery. Existing non-ECC error recovery methods typically consist of a sequence of predetermined error recovery procedures (ERP). An ERP may include: multiple attempts to read or write the data; a re-tensioning of the tape followed by an attempt to reread the data; changing the channel filter parameters and retry; tape head cleaning operations and other similar rehabilitative measures. These ERP are applied in a predetermined sequence regardless of the nature of the fault that caused the data error.

Attempts to read or write the data multiple times involve reversing the tape back to a ramp-up point before a target data block and accelerating to the target data block to be read or written again. Every time a retry fails, the tape drive reverses tape travel direction and continues its reverse linear travel until a ramp-up point past the target data block is reached. If the non-ECC recovery consists, for example of a sequence of twenty retries, then twenty tape forward/reverse cycles must occur to complete the process making the error recovery attempt time consuming. Additionally, repeated cycles may eventually cause tape degradation.

SUMMARY

The present invention is directed to a method of alternate tape repositioning during data recovery. According to the invention, an ERP is performed during both the forward half and the reverse half of the forward/reverse cycle. The method takes advantage of the reverse half of the tape forward/reverse cycle, to perform an ERP thereby reducing total data recovery time. A non-ECC recovery module may include as an example ten error recovery procedures, ERP1 trough ERP10. ERP1 trough ERP10 may include one or more error recovery procedures.

In the event that a tape drive fails to read a target data block, the tape continues its linear travel until a forward ramp-up point beyond the target data block is reached. The tape drive changes linear travel direction. When the tape heads are on top of the target data block, a first error recovery procedure is performed in the reverse linear travel direction. If the first error recovery procedure fails then the tape continues its reverse linear travel until a reverse ramp-up point past the target data block is reached. Once again, the tape drive changes linear travel direction and a second error recovery procedure is performed in the forward linear travel direction. If the error recovery procedure fails then the tape continues its forward linear travel to the forward ramp-up point. Once again, the tape drive changes tape travel direction and a third error recovery procedure is performed in the reverse linear travel direction. The procedure of tape advance, change tape travel direction and execute error recovery procedure continues until the data at the target data block is recovered, or until a pre-selected number of error recovery procedures have been executed. In the event that the pre-selected number of error recovery procedures have been executed without successful data recovery, a drive host may be notified of the failure to retrieve the data.

DESCRIPTION

Figure 1:
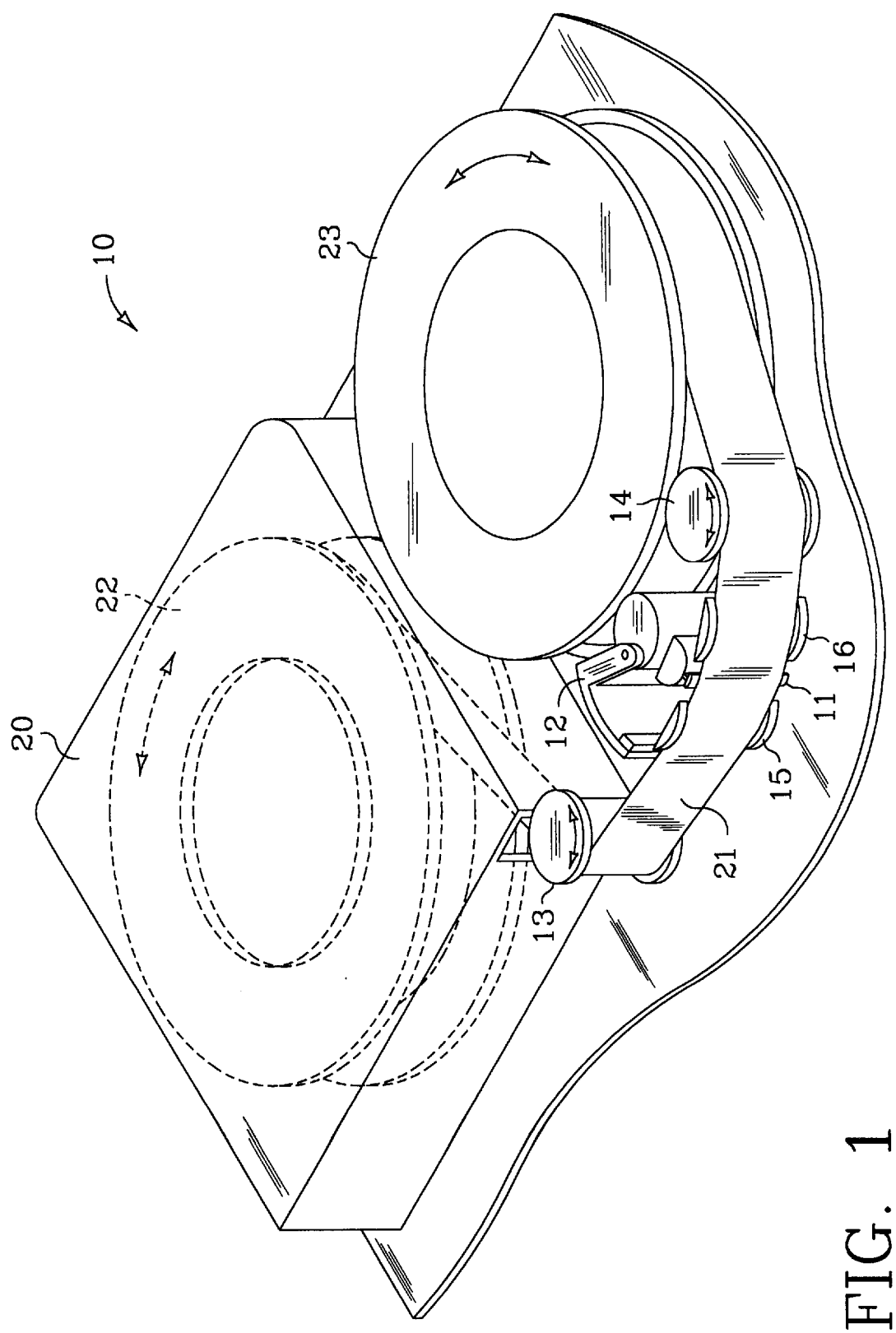
FIG. 1 is a perspective representational view of a tape drive.

FIG. 1 shows one configuration of tape drive 10 including tape cartridge 20 loaded therein. Tape drive 10 includes tape head 11 and tape head cleaning device 12 similar to the head cleaner described in U.S. Pat. No. 5,930,089. Tape 21 is wound about storage reel 22 held in tape cartridge 20 and take-up reel 23. Tape 21 is positioned for linear travel across tape head 11. Tape head cleaning device 12 is configured to permit movement directly against tape head 11. As shown in FIG. 1, tape 21 travels across roller guides 13 and 14, and stationary guides 15 and 16. Tape head 11 is positioned between stationary guides 15 and 16 so that tape 21 is tensioned against tape head 11 during normal operation.

Figure 2:
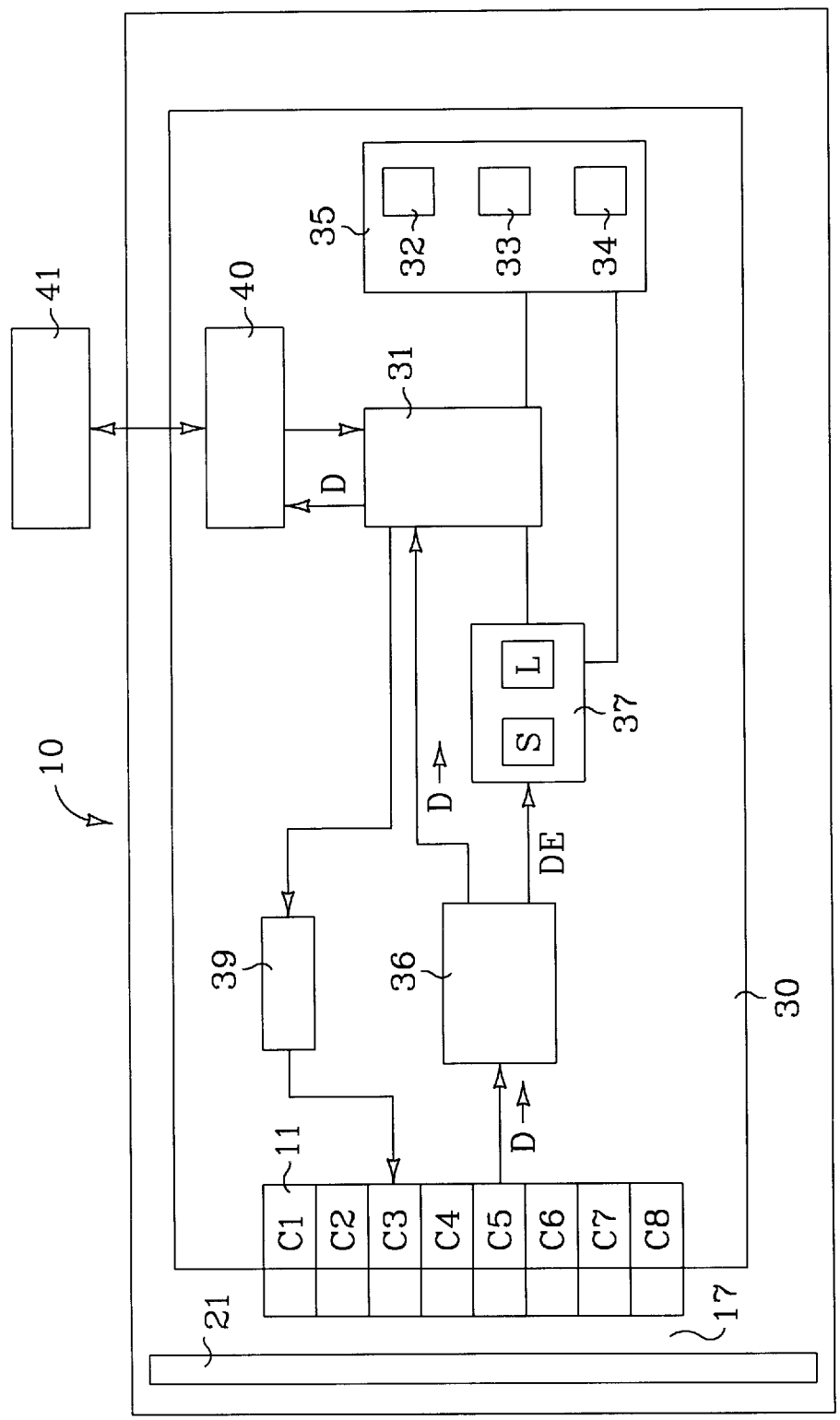
FIG. 2 is a schematic diagram of a tape drive.

FIG. 2 is a schematic diagram showing tape drive 10 including tape head 11. Tape drive 10 also includes control circuitry 30 including drive interface 40. Control circuitry 30 also includes controller 31 which controls the read/write operations of tape drive 10. Control circuitry 30 may include memory 35 for maintaining a variety of executable instructions including read procedure 32, write procedure 33 and drivers 34. A write operation may be performed by controller 31 executing write procedure 33. Data to be written onto tape 21 are encoded by controller 31 and transmitted to driver 39. Similarly, a read operation may be performed by controller 31 executing read procedure 32. Control circuitry 30 also includes ECC engine 36 and non-ECC error recovery module 37. Data input into and output from tape 21 are transmitted at tape/head interface 17. In a read operation, data D is conducted through ECC engine 36. If data D includes data transfer errors which are correctable by ECC engine 36, correction is made and the corrected data flows upstream through controller 31. In the event data signal D includes data transfer errors which are uncorrectable by ECC engine 36, controller 31 initiates operation of non-ECC error recovery module 37. Drive interface 40 permits connection to host 41.

Figure 3:
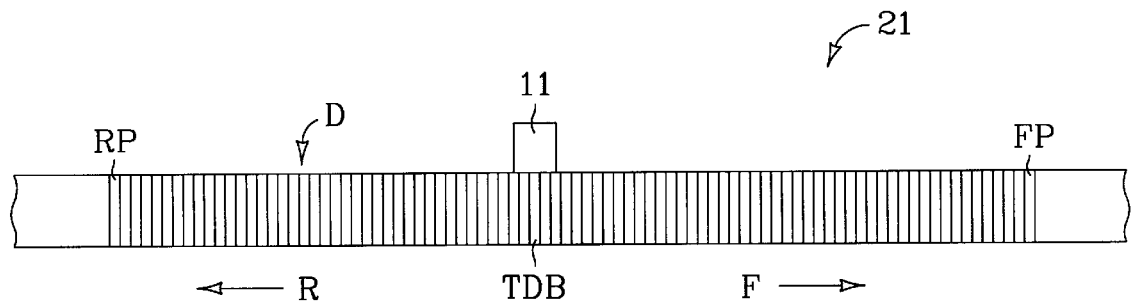
FIG. 3 is schematic diagram depicting a tape format.

FIG. 3 is schematic diagram depicting tape 21 including a plurality sequential data blocks D. FIG. 3 shows tape head 11 contacting tape 21 at target data block TDB. Tape 21 is driveable in both a first linear tape travel direction or forward linear tape travel direction F and a second or reverse linear tape travel direction R. First ramp-up point FP is located beyond target data block TDB and second ramp-up point RP located behind target data block TDB.

Figure 4:
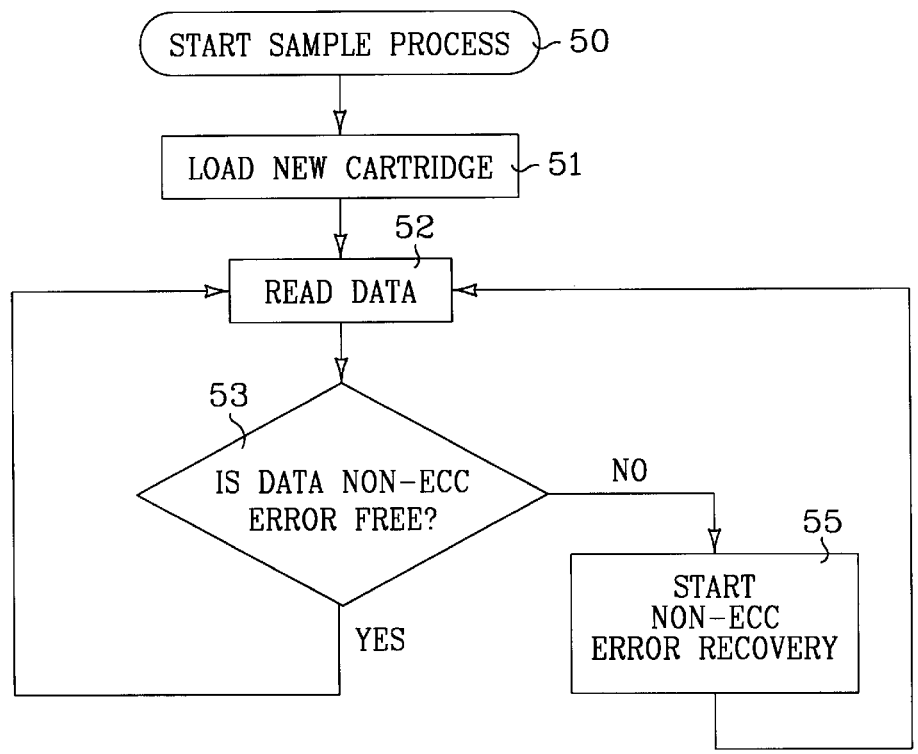
FIG. 4 is a flow chart depicting operation of a tape drive.

FIG. 4 is a flow chart depicting typical tape drive operation. Operation initiates at Start 50. A tape cartridge is loaded at Load New Cartridge 51. Read Data 52 initiates data transfer. Is Data Non-ECC Error Free? 53 represents "on-the-fly" operation of the ECC as data is transferred to or from the media and determines if a failure to transfer data is attributable to a non-ECC Error. In the event that error correction and detection circuitry detects an error which is non-recoverable by the error correction and detection circuitry, Non-ECC Error Recovery 55 is invoked. So long as the data is free of error or data error is correctable and recoverable by the ECC, the process continues with read data 52.

Figure 5:
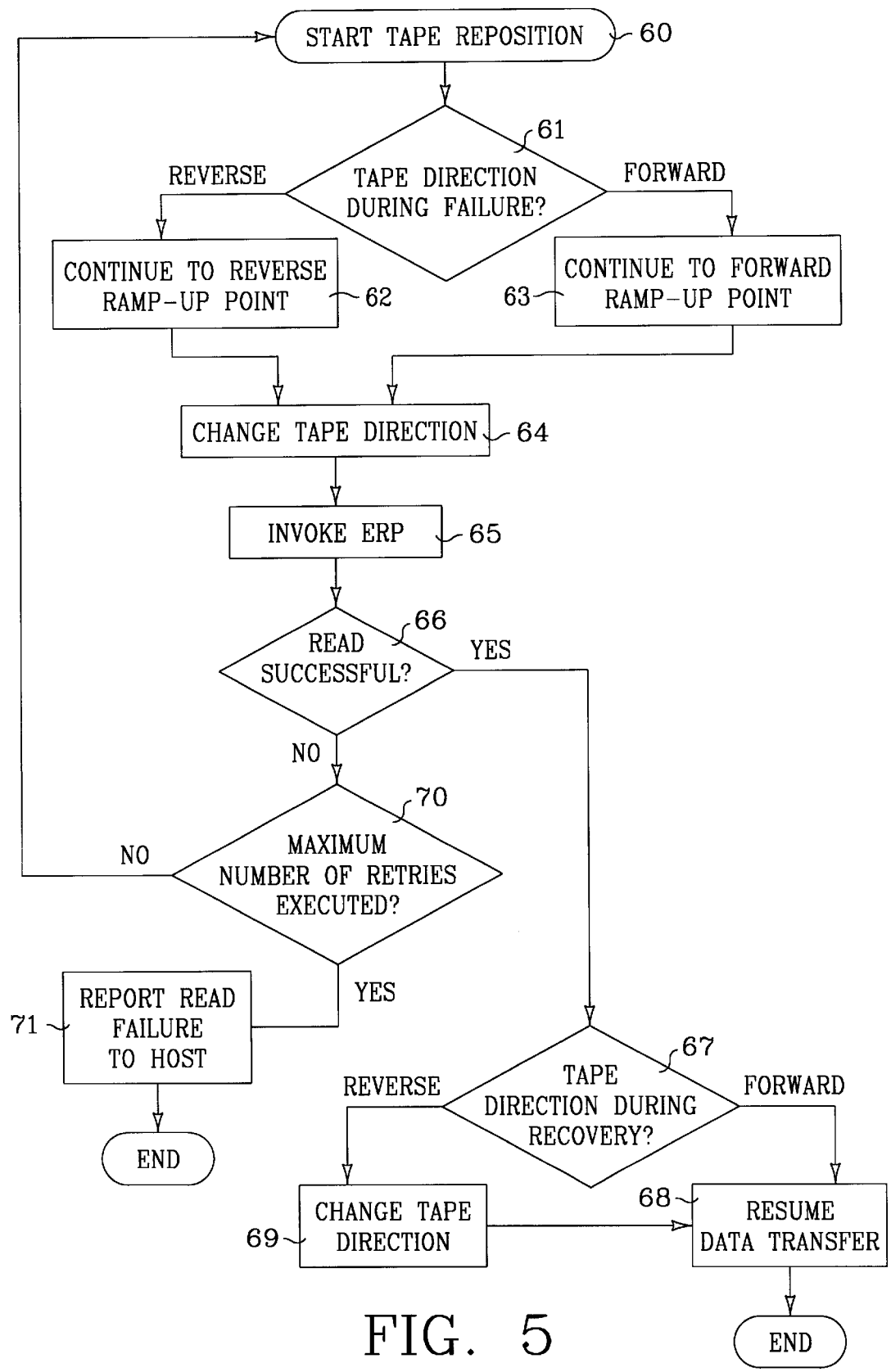
FIG. 5 is a flow chart depicting the steps of an alternate method of tape repositioning during data recovery.

FIG. 5 is a flow chart depicting steps of operation for a method of tape repositioning during data recovery following identification of a non-ECC recoverable error. Start Tape Reposition 60 initiates the process. Initially, the process determines linear tape travel direction at Determine Tape Direction 61. If linear tape travel direction is reverse, then Advance To Reverse Ramp-up Point 62 continues reverse linear tape travel direction to reverse ramp-up point behind the target data block. If linear tape travel direction is forward, then Advance To Forward Ramp-up Point 63 continues forward linear tape travel direction to forward ramp-up point past the target data block.

Change Tape Direction 64 then changes linear tape travel direction. In the event that linear tape travel direction was forward, Change Tape Direction 64 changes linear tape travel direction to reverse linear tape travel direction. In the event that linear tape travel direction was reverse, Change Tape Direction 64 changes linear tape travel direction to forward linear tape travel direction. Invoke ERP 65 initiates operation of any of a pre-selected group of error recovery procedure. Following execution of the error recovery procedure, the process determines if data was recovered at Read Successful 66.

If the error recovery procedure has recovered the target data, the process determines linear tape travel direction at Determine Tape Direction During Recovery 67. In the event that linear tape travel direction was forward during data recovery, then the tape drive continues forward linear tape travel direction and Resume Stream Reads 68 returns the process to read data 54. In the event that linear tape travel direction was reverse, Change Tape Direction 69 changes linear tape travel direction to forward linear tape travel direction. The tape drive continues forward linear tape travel direction and Resume Stream Reads 68 returns the process to read data 54.

If the error recovery procedure has not recovered the target data, the process determines if a pre-selected number of error recovery procedures have been executed at Maximum Number of Retries Exceeded 70. If the pre-selected number of error recovery procedure have been executed then an unrecoverable error is reported to a tape drive host at Report Read Failure to Host 71. If the pre-selected number of error recovery procedure have not been executed then the process returns to Tape Direction during data failure 61 and the process repeats until the target data is recovered or until a pre-selected number of error recovery procedure have been executed.

In operation, when tape drive 10 fails to read target data block TDB, tape 21 continues forward linear tape travel direction F until first ramp-up point FP, beyond target data block TDB is reached. Tape drive 21 changes linear tape travel direction to a reverse linear tape travel direction R. When tape head 11 is on top of target data block TDB, a first error recovery procedure is performed in the reverse linear tape travel direction R. If the first error recovery procedure fails to recover the data at target data block TDB then tape 21 continues reverse linear tape travel direction R until second ramp-up point RP is reached behind target data block TDB. Tape 21 changes and when tape head 11 is on top of target data block TDB, a second error recovery procedure is performed in forward linear tape travel direction F. If the second error recovery procedure fails then tape 21 continues its forward linear tape travel direction F until forward ramp-up point FP located beyond target data block TDB is reached. Once again, tape 21 changes linear tape travel direction to reverse linear tape travel direction R and when tape head 11 is on top of target data block TDB, a third error recovery procedure is performed in reverse linear tape travel direction R. The method of tape repositioning during data recovery may continue with a fourth error recovery procedure, a fifth error recovery procedure and so on until data at target data block TDB is recovered, or until a pre-selected number of retries allowed is reached.

While this invention has been described with reference to the detailed embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A method of repositioning a tape for data recovery following a failure to transfer data, the method comprising:

continuing a first linear tape travel direction to a first ramp-up point;

changing the first linear tape travel direction to a second linear tape travel direction;

continuing the second linear tape travel direction to a target data block; and invoking a first error recovery procedure at the target data block.

2. The method of repositioning a tape for data recovery of claim 1 further comprising a first step of determining a first linear tape travel direction during the failure to transfer data.

3. The method of repositioning a tape for data recovery of claim 1 further comprising determining if the first error recovery procedure was successful recovering data at the target data block.

4. The method of repositioning a tape for data recovery of claim 3 further comprising:

changing the second linear tape travel direction to the first linear tape travel direction; and resuming data transfer.

5. The method of repositioning a tape for data recovery of claim 1 further comprising:

continuing a second linear tape travel to a second ramp-up point beyond the target data block;

changing the linear tape travel direction to the first linear tape travel direction;

invoking a second error recovery procedure invoking at the target data block; and determining if the second error recovery procedure was successful recovering data at the target data block.

6. The method of repositioning a tape for data recovery of claim 5 further comprising resuming data transfer.

7. The method of repositioning a tape for data recovery of claim 5 further comprising:

continuing a first linear tape travel direction to a first ramp-up point;

changing the first linear tape travel direction to a second linear tape travel direction;

continuing the second linear tape travel direction to a target data block; and invoking a third error recovery procedure at the target data block; and determining if the third error recovery procedure recovered data at the target data block.

8. The method of repositioning a tape for data recovery of claim 1 wherein the first linear tape travel direction further comprises a forward linear tape travel direction.

9. The method of repositioning a tape for data recovery of claim 1 wherein the second linear tape travel direction further comprises a reverse linear tape travel direction.

10. The method of repositioning a tape for data recovery of claim 1 wherein the first error recovery procedure further comprises an attempt to re-read data.

11. A method of repositioning a tape for data recovery following a failure to transfer data, the method comprising:
continuing a first linear tape travel direction to a first ramp-up point;
changing the first linear tape travel direction to a second linear tape travel direction;
continuing the second linear tape travel direction to a target data block;
invoking a first error recovery procedure at the target data block; and
determining if the first error recovery procedure was successful recovering data at the target data block.

12. The method of repositioning a tape for data recovery of claim 11 further comprising:
changing the second linear tape travel direction to the first linear tape travel direction; and
resuming data transfer.

13. The method of repositioning a tape for data recovery of claim 11 further comprising:
continuing a second linear tape travel to a second ramp-up point beyond the target data block;
changing the linear tape travel direction to the first linear tape travel direction;
invoking a second error recovery procedure invoking at the target data block; and
determining if the second error recovery procedure was successful recovering data at the target data block.

14. The method of repositioning a tape for data recovery of claim 13 further comprising resuming data transfer.

15. The method of repositioning a tape for data recovery of claim 13 further comprising:
continuing a first linear tape travel direction to a first ramp-up point;
changing the first linear tape travel direction to a second linear tape travel direction;
continuing the second linear tape travel direction to a target data block;
invoking a first error recovery procedure at the target data block; and
determining if the first error recovery procedure was successful recovering data at the target data block.

16. The method of repositioning a tape for data recovery of claim 15 further comprising:
changing the second linear tape travel direction to the first linear tape travel direction; and
resuming data transfer.

17. The method of repositioning a tape for data recovery of claim 15 further comprising:
continuing a second linear tape travel to a second ramp-up point beyond the target data block;
changing the linear tape travel direction to the first linear tape travel direction;
invoking a second error recovery procedure invoking at the target data block; and
determining if the second error recovery procedure was successful recovering data at the target data block.

18. The method of repositioning a tape for data recovery of claim 11 wherein the first error recovery procedure further comprises an attempt to re-read data at the target data block.

19. The method of repositioning a tape for data recovery of claim 11 further comprising determining if a predetermined number of error recovery procedures have been executed.

20. The method of repositioning a tape for data recovery of claim 11 further comprising reporting to a host that a predetermined number of error recovery procedures have been executed.

21. A method of repositioning a tape for data recovery following a failure to transfer data, the method comprising:
continuing a first linear tape travel direction to a first ramp-up point;
changing the first linear tape travel direction to a second linear tape travel direction;
continuing the second linear tape travel direction to a target data block; invoking a first error recovery procedure at the target data block, the first error recovery procedure including a tape head cleaning operation; and
determining if the first error recovery procedure was successful recovering data at the target data block.

22. A method of repositioning a tape for data recovery following a failure to transfer data, the method comprising:
continuing a first linear tape travel direction to a first ramp-up point;
changing the first linear tape travel direction to a second linear tape travel direction;
continuing the second linear tape travel direction to a target data block;
invoking a first error recovery procedure at the target data block, the first error recovery procedure selected from a group of error recovery procedures including multiple attempts to read or write the data, re-tensioning the tape followed by an attempt to reread the data, changing channel filter parameters and tape head cleaning operation; and
determining if the first error recovery procedure was successful recovering data at the target data block.

23. A method of error recovery including repositioning a tape following a failure to transfer data, the method comprising:
failing to transfer data at a data block of a tape traveling in a first direction;
continuing the tape in the first direction to a first point beyond the data block;
reversing the tape to travel in a second direction;
performing a first error recovery procedure at the data block while the tape travels in the second direction;
continuing the tape in the second direction to a second point beyond the data block;
reversing the tape to travel in the first direction;
determining if the first error recovery procedure was successful in recovering data at the target data block; and
performing a second error recovery procedure at the data block while the tape travels in the first direction.

* * * * *